J. H. UTLEY.
PROCESS OF PURIFYING ANIMAL CHARCOAL AND THE PRODUCT THEREOF.
APPLICATION FILED JAN. 27, 1909.
947,503.
Patented Jan. 25, 1910.
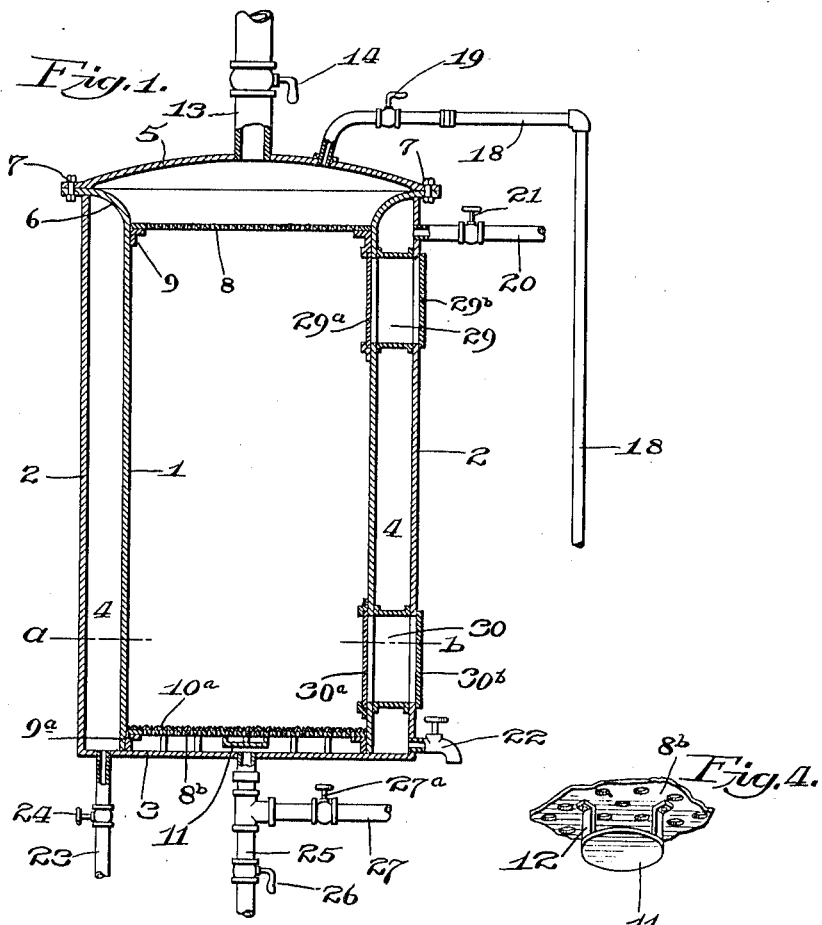
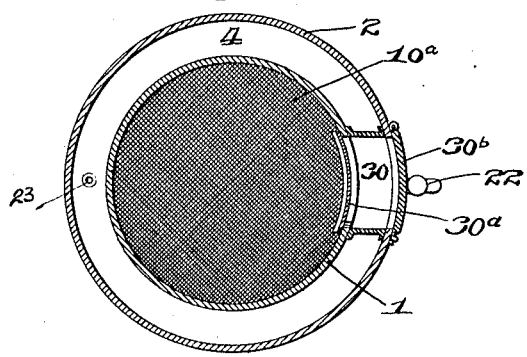
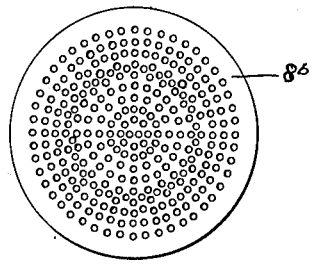
WITNESSES
INVENTOR
John Henry Utley
BY
ATTORNEY ically the restoration or revivification
UNITED STATES PATENT OFFICE.

JOHN HENRY UTLEY, OF CAMDEN, NEW JERSEY.

PROCESS OF PURIFYING ANIMAL CHARCOAL AND THE PRODUCT THEREOF.

947,503.  Specification of Letters Patent.  Patented Jan. 25, 1910.

Application filed January 27, 1909. Serial No. 474,426.

*To all whom it may concern:*

Be it known that I, JOHN HENRY UTLEY, a subject of the King of Great Britain, residing in the city of Camden, State of New Jersey, have invented a certain new and useful Process of Purifying Animal Charcoal and the Product Thereof, of which the following is a full, clear, and exact description, reference being had to the accompanying drawings, forming a part of this specification.

My invention relates to the purification of animal charcoal or bone black to prepare it for use in the industrial arts as an agent for clarifying and decolorizing gelatin and glue liquors, sugar and glucose solutions, and the like. When so employed it is comminuted or at least ground to a granulated condition of fineness; in character it is porous and hence highly absorbent, but there are two objections to its use, first because of calcium phosphate and perhaps other mineral salts and impurities, combined with it, and hence it is not in its highest state of efficiency initially; and when once used for the purposes stated, it loses much of its porous character, taking on an apparent change of composition, due largely if not wholly to absorption of salts and acids from the gelatin liquor or other liquid clarified and decolorized by it, and is thereby rendered wholly inefficient, in such condition, for a repetition of the process, but capable of being revivified, as it is called, which is a troublesome and expensive method, commonly effected by a washing of the spent charcoal followed by a reburning of it.

My invention has two objects in view, principally the restoration or revivification of such spent animal charcoal, and incidentally the treatment of it, in its initial state, to render it more efficient; my process, about to be described, fully effecting both objects by the same steps, acting successively on the same body of animal charcoal in its initial and spent conditions respectively, or on the latter only if the first application is not deemed essential or desirable for the particular liquid material to be clarified and decolorized.

To these ends my invention consists in the discovery and its application, that if a body of animal charcoal of commerce, ground to a granulated condition and confined in a substantially closed vessel, with suitable inlet and outlet apertures to connect steam and water pipes thereto, is subjected to the action of a volume of live steam blown through it, followed preferably by a washing with a volume of hot water, driven preferably in the opposite direction, through the container vessel, that the animal charcoal will not only be deprived of deleterious impurities but the steam will deprive it, by chemical action perhaps, of its combined salts, which have never heretofore been removed from it; and that ground animal charcoal, so prepared for use as a clarifying and decolorizing medium is not only more efficient as such, but what is of greater value, the charcoal after such use, can be perfectly restored and revivified by a repetition of the same steps, thereby wholly saving the labor and expense of washing and re-burning it as now commonly practiced.

My process, in its action on ground animal charcoal in the initial state, apparently removes from it the calcium phosphate and other impurities with which it is combined or charged, and hence makes it more efficient because making it more porous, and hence more absorbent, as well as depriving it of soluble salts which retard or injuriously affect the clarification of sensitive gelatin liquor and, more or less, other liquid solutions so treated. In its action on spent animal charcoal, to restore or revivify it, it drives out of it the coloring matter and impurities, as also the soluble salts and acids which it has taken up, in the clarifying and decolorizing process, from the gelatin liquor or other liquid material so acted on, restoring fully its porous and absorbent character as well as otherwise purifying it for the uses intended.

For the purpose of practically carrying out my new process and producing the product thereof, I have devised a container vessel in which such treatment of the animal charcoal may be effected by the method described. This container is shown in the accompanying drawings, in which—

Figure 1 is a vertical section partly in elevation; Fig. 2 is a section on line *a—b* of Fig. 1 showing in plan view a suitable screen; Fig. 3 a plan of a suitable strainer plate, and Fig. 4 a view, in perspective, of a deflecting or baffle plate.

In essentials the said container comprises a metallic cylinder, preferably of copper which is tin-plated interiorly as usual with copper vessels. For facility in construction and assembling, the container is a cylinder 1, with an open base and outwardly flaring top 6. It rests within a metallic cylinder 2 of larger diameter, having closing plate 3 at base and an open top. The top edge of the latter coincides with the underface of the flaring edge 6 of the copper container, and hence there is provided a water jacket 4 to keep the container hot, though its place may be supplied, for that purpose, by the common expedient of an asbestos covering. Angle iron brackets 9ª at the base of the container support a perforated strainer plate 8ᵇ (see Fig. 3) and preferably, superposed thereon, a fine screen 10ª is placed. Centrally disposed on the lower side of the strainer plate 8ᵇ is mounted a baffle plate 11 with bracket arms 12 to fasten it to the strainer plate. The basal closing plate 3 is apertured centrally to admit the end of water discharge pipe 25, which is governed by cock 26; and above the latter a steam pipe 27 governed by cock 27ª is let into water pipe 25. Means to supply hot water, and steam if need be, to the water jacket 4 are provided by pipe 20 governed by cock 21, and pipe 23 governed by cock 24; while the spigot 22 operates as a water discharge. Manholes 29 and 30 are provided to charge and discharge the container 1 of its charcoal contents. At the top end of the container 1, other angle-iron brackets 9 support a like strainer plate 8 (see Fig. 3) and above that and resting on the flaring edge 6 of the container, is a removable cover plate 5 secured thereto, as by screw-bolts 7. One or more pipes 18, governed by cock 19 and let into the cover-plate 5 supply hot water to the interior of the container; and a centrally-disposed pipe 13 of comparatively large diameter, governed by cock 14, is let into cover plate 5 to operate as a steam-discharge port.

In operating said apparatus to carry out the process and produce the purified animal charcoal, the container vessel may be charged to nearly its full capacity, through the upper manhole 29, with the ground bone black to be purified. Live steam is then driven through the contained mass, by closing water cock 26 and opening the cock of steam pipe 27. By this means the steam is discharged upwardly through the charcoal mass, deflected or spread by the baffle plate 11, and passing out of the pipe 13, and I prefer this direction of introducing the steam as it prevents packing of finely granulated bone black, which would otherwise be liable to occur with finely ground charcoal if the steam was driven downwardly through it. After this step has proceeded for a half hour more or less, the steam supply cock of pipe 27 is closed and cock 26 of water pipe 25 is opened. The contained bone black is then washed by the admission of hot water, through pipes 18, passes downwardly through the mass, discharging through pipe 25. The purified bone black is then ready to be removed from the container for use in clarifying and decolorizing apparatus as usual; and after, by such use, its power is spent, it can be placed in the container and revivified by a repetition of the same means as described in initially treating the original material, the same treatment driving out salts and acids absorbed by it, making it porous again and having the effect of restoring to it all its initial power as a clarifying and decolorizing agent; and by this method it may be so restored, not once, but quite a number of times, a dozen or more according to my experience, varying somewhat with the character of the material clarified and decolorized.

Having thus described my invention, I claim as new and desire to secure by Letters Patent:—

1. The process described of purifying animal charcoal for use as a clarifying and decolorizing agent, which consists in subjecting a body of animal charcoal, in a substantially closed vessel, to the action of a volume of live steam blown upwardly through it, and then to a washing with hot water discharged through it in the opposite direction.

2. The process described of revivifying spent animal charcoal for re-use as a clarifying and decolorizing agent, which consists in subjecting a body of such spent animal charcoal, in a substantially closed vessel, to the action of a volume of live steam blown upwardly through it, and then to the action of hot water discharged through it in the opposite direction.

3. The product of the process described which is ground animal charcoal of commerce deprived of its combined salts which are soluble in live steam.

4. The product of the process described which is spent animal charcoal which has been purified and revivified by the successive action on it of live steam and a hot water washing.

In testimony whereof, I have hereunto affixed my signature this 16th day of January A. D. 1909.

JOHN HENRY UTLEY.

Witnesses:
A. M. BIDDLE,
R. A. DUNLAP.